United States Patent Office.

LUDWIG HEYER, OF BERLIN, GERMANY, ASSIGNOR TO FRANZ OTTO SPIELHAGEN, OF SAME PLACE.

PROCESS OF PREPARING WATER-TIGHT FABRICS.

SPECIFICATION forming part of Letters Patent No. 288,635, dated November 20, 1883.

Application filed July 2, 1883. (No specimens.) Patented in Germany December 29, 1882, and in France April 30, 1883, No. 142,853.

*To all whom it may concern:*

Be it known that I, LUDWIG HEYER, of the city of Berlin, in the Kingdom of Prussia, and German Empire, have invented new and useful Improvements in a Process for the Preparation of Water-Tight Fabrics, of which the following is a specification.

The methods hitherto suggested or resorted to for the preparation of water-tight fabrics, made either of hemp, flax, wool, or cotton fibers, have been attended with the drawbacks of want of durability of the fabrics under the influence of temperature and moisture, as well as an insufficient porosity of the prepared material, and of the very high price, which excludes the more general use of the same.

The object of my said invention is to remove these imperfections, for which said purpose I have made a long series of experiments, which have resulted in a process which has proved highly successful, without being expensive.

The preparation of the mass to be used and its application to the fabrics to be so prepared takes place as follows: About one hundred parts of india-rubber (either fresh or old material in large or small pieces) with ten to fifteen parts of linseed-oil and about five parts of red oxide of iron are put into a boiler and heated above a strong fire. These materials are heated to about 275° to 278° centigrade under continual stirring, and kept at such said temperature until the same is converted into a viscid or pulpy mass. Through the addition of the red oxide of iron, which lessens the radiation of heat from the boiling mass, whereby the heat is more readily retained in the latter, the preparation of the said mass to its required temperature and condition is considerably accelerated, so much so that only about one-third of the otherwise necessary amount of heat from the fire is required. The so-prepared mass is now forced through a metal sieve, which is placed in suitable proximity to the fire, for the purpose of freeing the said mass from all impurities or foreign bodies that might have been contained in the said india-rubber or linseed-oil. After the mass has been cleaned or purified in the manner described, the same is put into an apparatus, vessel, or boiler with double walls or mantle, and provided with steam-heating and allowed to cool gradually down to about 78° centigrade. After this has been done, up to two hundred parts of ozocerite are added to the mass and the same subjected to a temperature of not more than 78° centigrade until the ingredients are converted into a perfectly homogeneous mass. This process of heating is best carried out by means of steam, although other modes of heating can be employed. At the above-mentioned height of temperature the so-prepared mass combines readily with any coloring-matter or property which is otherwise foreign to ozocerite, but which is of the utmost importance in cases where a certain coloring of the prepared fabrics is either desirable or necessary. In the last-mentioned vessel or apparatus which contains the so-prepared mass I employ a system of small rollers, by means of which the fabric put into the vessel or apparatus for preparation is drawn through a colander of known construction. This said colander is provided with two hollow heated rollers and one solid roller with a yielding surface—for instance, india-rubber—which latter presses the superfluous mass out of the fabric under treatment.

Experience, founded on experiments on a large scale, has proved that fabrics impregnated with a mass, as afore described, first are completely water-tight and as smooth and flexible as in their original condition without being air-tight; second, are thoroughly protected against rot, so that a wet fabric can at once be compressed into its smallest volume and put away without any damage being done to the same; third, do not grow soft in warm weather, nor sticky and dirty, neither do they get flawy or brittle if subjected to the greatest cold, but, on the contrary, retain their flexibility; fourth, increase in weight but very little. It follows that this process must be of great advantage if applied to covers for vehicles, trucks, tents, &c., for sails and garments, and especially for bread-bags and knapsacks of soldiers, and other articles which are greatly subjected to the influence of the atmosphere, and therefore require the greatest possible durability. If strongly impregnated—that is to say, if repeatedly passed through the colander, and when closely-woven fabrics are employed—even hose for the transport or storing of liquids can be made.

In order to fully appreciate the new process, it should not be overlooked that it offers the advantage of the utilization of old waste material—as, for instance, old and worn-out or otherwise useless articles of caoutchouc or india-rubber--an advantage which, together with the aims of the whole process, indicate its eminent importance.

What I claim as my invention, and desire to secure by Letters Patent, is—

1. The preparation of water-tight fabrics or similar materials which are not affected by the influence of temperature or atmosphere and do not lose their property of admitting air, by impregnating the same with a prepared mass, substantially as set forth in the foregoing specification.

2. The production of a substance for impregnating fabrics, consisting of about one hundred parts of india-rubber or caoutchouc, ten to fifteen parts linseed-oil, and five parts of red oxide of iron, by heating same to 275° to 278° centigrade under continuous agitation, substantially as set forth in the foregoing specification.

3. The cleansing or purifying of the said mass by forcing same through a sieve and then allowing it to gradually cool down to 78° centigrade, substantially as set forth in the foregoing specification.

4. The addition of five to two hundred parts of ozocerite and maintaining a temperature of about 78° centigrade until a homogeneous mass has been formed, which is then ready to take any desired color, which said mass is then closely amalgamated with the fabric to be made water-tight by means of a colander of suitable construction, substantially as set forth in the foregoing specification.

In witness whereof I have hereunto signed my name in the presence of two subscribing witnesses.

LUDWIG HEYER.

Witnesses:
 B. ROI,
 EDWIN A. BRYDGES.